United States Patent [19]

Kurosawa

[11] 4,267,499
[45] May 12, 1981

[54] METHOD AND SYSTEM FOR CONTROLLING INDUCTION MOTORS

[75] Inventor: Ryoichi Kurosawa, Tokyo, Japan

[73] Assignee: Tokyo Shibaura Kenki Kabushiki Kaisha, Tokyo, Japan

[21] Appl. No.: 970,443

[22] Filed: Dec. 18, 1978

[30] Foreign Application Priority Data

Dec. 23, 1977 [JP] Japan .................. 52-154529

[51] Int. Cl.³ .................. H02P 5/34; H02P 7/42; H02P 5/28; H02P 7/36
[52] U.S. Cl. .................. 318/800; 318/798; 318/807
[58] Field of Search .......... 318/798, 799, 800, 801-812

[56] References Cited

U.S. PATENT DOCUMENTS

| | | | |
|---|---|---|---|
| 3,593,083 | 7/1971 | Blaschke | 318/803 |
| 3,700,986 | 10/1972 | Cushman et al. | 318/800 |
| 4,023,083 | 5/1977 | Plunkett | 318/802 |
| 4,051,419 | 9/1977 | Takahashi | 318/808 |
| 4,088,934 | 5/1978 | D'Atre et al. | 318/802 |

OTHER PUBLICATIONS

Blaschke, *Siemens Review* XXXIX (1972), No. 5, "The Principle of Field Orientation as Applied to the New Transvektor Closed-Loop Control System for Rotating-Field Machines", pp. 217-220.

*Primary Examiner*—J. V. Truhe
*Assistant Examiner*—John B. Conklin
*Attorney, Agent, or Firm*—Stevens, Davis, Miller & Mosher

[57] ABSTRACT

The speed of an induction motor fed from a frequency converter is controlled by controlling the primary current by a primary current vector. To this end, a digital quantity corresponding to the slip frequency is sequentially added at a predetermined interval, and a digital quantity proportional to the angle of rotation is added to obtain a sum value. Then the primary current vector is computed from the sum value and a current component which influences only the torque to control the frequency converter. The method is suitable to be carried out with a microcomputer.

10 Claims, 13 Drawing Figures

METHOD AND SYSTEM FOR CONTROLLING INDUCTION MOTORS

BACKGROUND OF THE INVENTION

This invention relates to a method and a system for controlling an induction motor fed from a frequency converting apparatus, more particularly to a method and a system for digitally controlling an induction motor.

When driving an induction motor (hereinafter merely called a motor) from frequency converting apparatus whose output voltage and frequency can be varied, the speed of the motor has been controlled by controlling the slip frequency thereof. The slip frequency has been controlled as a function of the primary current so as to improve the torque efficiency (the ratio of the output torque to the primary current) by taking into consideration the magnetic saturation of the motor, or the output torque has been made to be proportional to the primary current. These methods operate satisfactorily where the primary current is constant or varies gradually but when they are applied to a case where quick response is desired so that it is necessary to effect quick control, primary current transient oscillations occur in the output torque thus causing the control to become unstable.

It has been found that poor control response of the motor is caused by the fact that, since the frequency converting apparatus is constructed to supply the primary current to the motor, when the power factor varies due to the load variation of the motor, the phase of voltage with respect to current varies, in other words, the frequency of the magnetic flux varies thus causing unstable phenomena. These problems which occur when the torque of the motor is varied have been solved by varying the slip frequency, and the amplitude and phase of the primary current in accordance with the motor constants. As a consequence, a control response similar to that of DC motors can be provided for induction motors.

To effect such control, however, it is necessary to treat the primary current as a vector quantity involving not only its amplitude and frequency but also its phase. For this reason, it is necessary to arithmetically operate by considering also the motor constants so that the computation circuit becomes very complicated including a number of multipliers and dividers. Accordingly, to control the motor speed, including to a stop, it is necessary to control the frequency starting from zero so that it is difficult to precisely synthesize the slip frequency. Furthermore, adjustment of the computation circuit is troublesome. Where motors of a different rating or type are to be controlled, the operation must be adjusted. Even when the adjustment is made correctly, variation in the winding temperature and variation in the motor constants due to magnetic saturation prevent optimum control response, thus requiring a large amount of time and labor for accurate adjustment.

SUMMARY OF THE INVENTION

It is an object of this invention to provide a novel method and system of controlling an induction motor capable of controlling the same to have an operating characteristic similar to that of a direct current motor.

A more specific object of this invention is to provide an improved method and system of controlling an induction motor capable of digitally controlling the slip frequency thereof with simplified steps and circuit which is accurate and can be readily adjusted for induction motors having different constants.

Another object of this invention is to provide a novel method and system of controlling the slip frequency of an induction motor which can readily be implemented with a microcomputer.

According to one aspect of this invention there is provided a method of controlling an induction motor comprising the steps of sequentially adding digital quantities corresponding to a slip frequency of the motor at a predetermined time interval; adding the sum of the sequentially added digital quantities to a digital quantity proportional to an angle of rotation of the motor to obtain a sum value; computing a primary current vector of the induction motor from the sum value and a current component which influences only the torque of the motor; and controlling the primary current of the induction motor based upon the primary current vector.

According to another aspect of this invention there is provided a system of controlling an induction motor comprising frequency converting apparatus including a rectifier and an inverter for supplying variable frequency alternating current to said motor; means responsive to a predetermined torque instruction T and a predetermined flux instruction $\Phi_o$ to produce a slip frequency signal $\Delta\theta_s$; means responsive to said slip frequency signal to produce a slip angle signal $\theta_s$; means responsive to the rotation of said motor for producing a rotational angle signal $\theta_r$; a first adder for adding together said slip angle signal $\theta_s$ and said rotational angle signal $\theta_r$; first selection switch means for selecting predetermined one $\theta_\alpha$ of a plurality of rotational angles of said motor; a second adder for adding together the outputs of said first adder and said first transfer switch means; means responsive to said torque instruction and said flux instruction for producing a current signal $i_{1q}$ which influences the torque of said motor; means responsive to said flux instruction and a flux change of said motor during a sampling period for producing a current signal $i_{1d}$ which influences the magnetic flux of said motor; a function circuit for producing a cosine function of the output of said second adder; a multiplier for multiplying the output of said function circuit with either one of said current signals $i_{1q}$ and $i_{1d}$; means responsive to the output of said multiplier for controlling said frequency converting apparatus; and a sequence controller for sequentially operating various means and elements described above.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Before describing preferred embodiments of this invention, the principle thereof will firstly be described.

Figure 1:
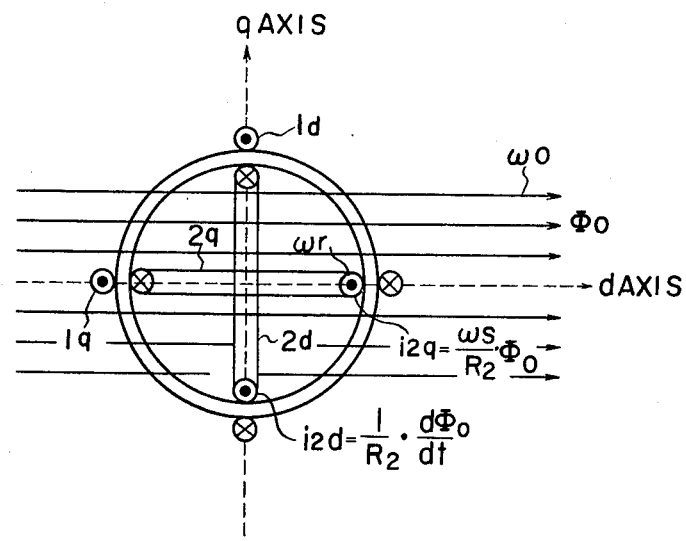
FIG. 1 is a diagrammatic representation of an induction motor for explaining the principle of this invention.

FIG. 1 is a diagram showing the principle of an induction motor comprising a primary winding $1_d$ and a secondary winding $2_d$ which produce a magnetomotive force in the direction of a d axis which is parallel with the direction of magnetic flux $\Phi_o$ linking the secondary winding of the motor and transformed primary and secondary windings $1_q$ and $2_q$ which produce a magnetomotive force in the direction of a q axis perpendicular to the d axis. It is now assumed that flux $\Phi_o$ is rotating in the counterclockwise direction at an angular speed of $\omega_o$ and that the secondary (rotor) is rotating in the counterclockwise direction at an angular speed of $\omega_r$.

A secondary q axis winding $2_q$ cuts the flux $\Phi_o$ at a slip angular speed $\omega_s$ ($=\omega_o-\omega_r$) to create a speed electromotive force so that current $i_{2q}$ ($i_{2q}=\omega_s/R_2\cdot\Phi_o$) flows as shown where $R_2$ represents the value of the secondary resistance $R_2$. Since the d axis secondary winding $2_d$ encircles the flux $\Phi_o$ there is no speed electromotive force but current $i_{2d}$ ($i_{2d}=1/R_2$) flows due to the variation with time of the flux $\Phi_o$.

Figure 2:
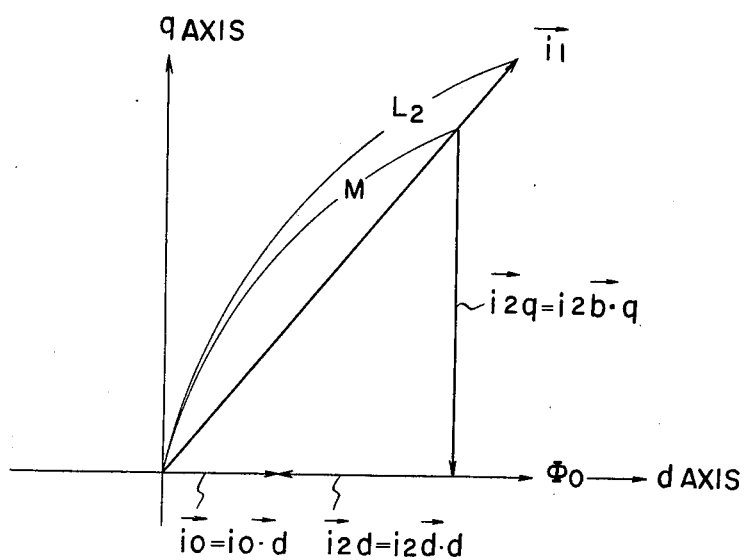
FIG. 2 shows a vector diagram of the induction motor diagrammatically shown in FIG. 1.

FIG. 2 shows a space vector depicted by utilizing a unit vector d in the direction of d axis and a unit vector q in the direction of q axis wherein the secondary current is shown by a current vector $I_o$ having the same direction as $\Phi_o$ and a value $i_o$ ($i_o=\Phi_o/L_2$) where $L_2$ represents the secondary inductance, and wherein the currents are expressed by current vectors $i_{2d}$ and $i_{2q}$ having the same direction as that of the magnetomotive force created by respective windings and the same magnitude as that of the current, and the flux $\Phi_o$ is treated as the magnetizing current which creates the flux $\Phi_o$. The primary current vector $\vec{i_1}$ is shown by a vector corresponding to the sum of vectors $\vec{I_o}$, $-\vec{i_{2d}}$ and $\vec{i_{2q}}$, which is multiplied with a coefficient $L_2/M$ determined by taking into consideration the magnetic coupling between the primary and the secondary windings where M represents the mutual inductance of the primary and secondary windings of the motor.

The following equation (1) is a vector equation showing this relationship, while equation (2) shows the output torque T of the motor expressed by the product of flux $\Phi_o$ and current $i_{2q}$ orthogonal thereto $$\vec{i_1} = \frac{L_2}{M}\left[\left(\frac{\Phi_o}{L_2} + \frac{1}{R_2}\cdot\frac{d\Phi_o}{dt}\right)\vec{d} + \left(\frac{1}{R_2}\cdot\omega_s\cdot\Phi_o\right)\vec{q}\right] \quad (1)$$

$$T = \frac{1}{R_2}\cdot\Phi_o^2\cdot\omega_s \quad (2)$$

Equations (1) and (2) mean that when the slip angular frequency $\omega_s$ and flux $\Phi_o$ are known, the primary current vector $\vec{i_1}$ and the output torque T can be determined. Conversely, when the primary current vector $\vec{i_1}$ and the slip angular frequency $\omega_s$ are given, the flux $\Phi_o$ and its rate of variation can be determined, thus obtaining the output torque T.

By modifying equation (2), we obtain $$\omega_s = \frac{R_2}{\Phi_o^2}\cdot T \quad (3)$$

Thus, when a desired torque T and a desired flux $\Phi_o$ are given, a slip frequency $\omega_s$ corresponding thereto can be determined. Furthermore, the primary current vector $\vec{i_1}$ shown by equation (1) is necessary for determining desired torque T and flux $\Phi_o$ can be determined from these values of $\Phi_o$ and $\omega_s$. Accordingly, it is possible to coincide the actual torque and flux of the motor with the desired torque T and flux $\Phi_o$ when the primary current of the motor is controlled in accordance with the primary current vector $i_1$ thus determined.

Thus, it is possible to effect a control which is equivalent to the field control of a DC motor so that it becomes possible to provide a control of rapid response characteristic by means similar to the control of a DC motor even when the control system is constructed to perform speed control and position control.

Figure 3:
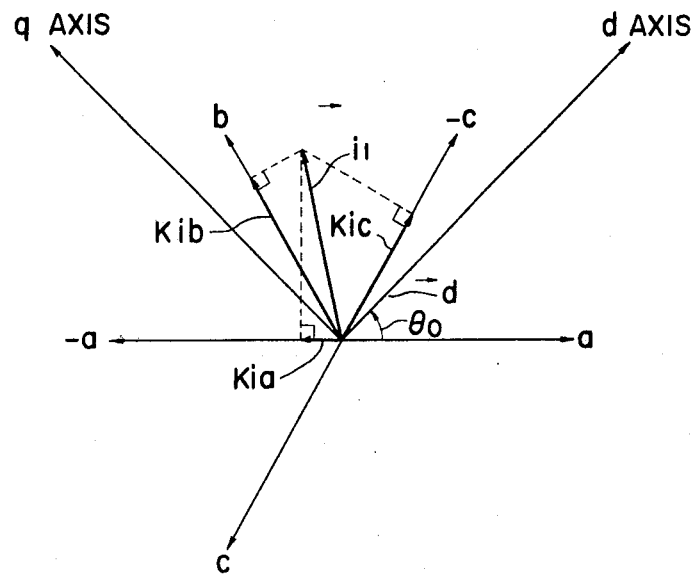
FIG. 3 is a vector diagram showing the relationship between the primary current vector of the induction motor shown in FIG. 1 and the primary current vectors of respective phases of a three phase induction motor.

Since equation (1) is expressed by vector quantities it is impossible to apply the aforementioned principle to the actual control of the primary current of an induction motor.

Where the unit vectors $\vec{d}$ and $\vec{q}$ are expressed by polar coordinate as $\vec{d}=(1,\theta_o)$, since axes q and d intersect each other at right angles, it is possible to express $$\vec{q}=(1,\theta_o+\pi/2)$$

where $\theta_o$ represents the angle of rotation of vector $\vec{d}$. Since vector d is rotating with respect to the secondary (rotor) at a slip angle frequency of $\omega_s$, $$\theta_o=\theta_r+\theta_s$$

where $\theta_r$ represents the position of the rotor and $\theta_s$ represents the slip angle of a time integration of the slip angle frequency.

Where the motor is a three phase induction motor and the positions of respective phase windings a, b and c are denoted by $\theta_a$, $\theta_b$ and $\theta_c$, the relative angular positions of the windings a, b and c are shown by 0, $2\pi/3$ and $4\pi/3$ respectively. The relationship between respective phase currents $i_a$, $i_b$ and $i_c$ and the primary current vector $i_1$ is shown in FIG. 3, wherein the primary current vector $i_1$ is projected upon the axes of respective phase windings. Symbol K shown in FIG. 3 is a conversion coefficient which is a constant that is equal to $\sqrt{3/2}$ in the case of a 3 phase motor so that it is not necessary to consider it in executing a desired control. Accordingly, the primary currents $i_a$, $i_b$ and $i_c$ of respective phases are shown as follows:

$$i_a = \frac{1}{K} \cdot \frac{L_2}{M} [ (\frac{\Phi_o}{L_2} + \frac{1}{R_2} \cdot \frac{d\Phi_o}{dt}) \cos \theta_o + \qquad (4)$$
$$\frac{T}{\Phi_o} \cdot \cos (\theta_o + \frac{\pi}{2})]$$

$$i_b = \frac{1}{K} \cdot \frac{L_2}{M} [ (\frac{\Phi_o}{L_2} + \frac{1}{R_2} \cdot \frac{d\Phi_o}{dt}) \cos (\theta_o - \frac{2\pi}{3}) + \qquad (5)$$
$$\frac{T}{\Phi_o} \cos (\theta_o - \frac{2\pi}{3} + \frac{\pi}{2})]$$

$$i_c = \frac{1}{K} \cdot \frac{L_2}{M} [ (\frac{\Phi_o}{L_2} + \frac{1}{R_2} \cdot \frac{d\Phi_o}{dt}) \cos (\theta_o - \frac{4\pi}{3}) + \qquad (6)$$
$$\frac{T}{\Phi_o} \cos (\theta_o - \frac{4\pi}{3} + \frac{\pi}{2})]$$

Further, these primary currents are also expressed as follows:

$$i_a = i_x \cdot \cos(\theta_o + \theta_x) \qquad (7)$$

$$i_b = i_x \cdot \cos(\theta_o + \theta_x - \frac{2\pi}{3}) \qquad (8)$$

$$i_c = i_x \cdot \cos(\theta_o + \theta_x - \frac{4\pi}{3}) \qquad (9)$$

where $$i_x = \frac{1}{K} \cdot \frac{L_2}{M} \sqrt{(\frac{\Phi_o}{L_2} + \frac{1}{R_2} \cdot \frac{d\Phi_o}{dt})^2 + (\frac{T}{\Phi_o})^2}$$

$$\theta_x = \tan^{-1} \frac{\frac{T}{\Phi_o}}{\frac{\Phi_o}{L_2} + \frac{1}{R_2} \cdot \frac{d\Phi_o}{dt}}$$

In equations (4) through (9), since K is a constant as above described and since $L_2/M$ can also be deemed as a constant because secondary inductance L and the primary/secondary mutual inductance M are caused to vary substantially in the same manner by magnetic saturation, these constants are neglected in the following description.

Figure 4:
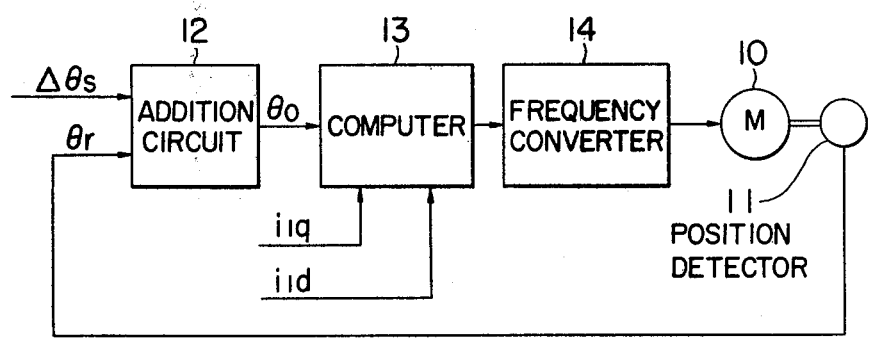
FIG. 4 is a block diagram showing the basic construction of the control system embodying the invention.

FIG. 4 is a block diagram showing the basic construction of the system of this invention which comprises an induction motor 10, a position detector 11 which detects the angular position of the rotor of the motor, an addition circuit 12 which sequentially adds a value $\Delta\theta_s$ corresponding to a slip frequency $\omega_s$ and then adds a value $\theta_r$ proportional to the position of the rotor to the sum for calculating the angle of rotation $\theta_o$ of a vector $\vec{d}$, a computer 13 for calculating the primary current vector of the motor 10 based upon $\theta_o$ and current $i_{lq}$ which influences only the motor torque, or based upon $\theta_o$, current that influences only the torque of the motor and current $i_{ld}$ which influences the motor flux, and a frequency converter which supplies alternating current to the motor 10.

FIG. 4 shows a system for controlling the slip frequency to have a constant value but where the torque and flux are variably controlled as mentioned above, the primary current vector can also be calculated in accordance with a torque instruction and a flux instruction.

In the following embodiment, a digital control is effected in accordance with the calculations of equations (4), (5) and (6) when a torque instruction T and a flux instruction $\Phi_o$ are given.

When these instructions are given the current $i_{lq}$ that influences only the torque can be determined as follows from equations (1) and (2)

$$i_{lq} = \frac{T}{\Phi_o} \qquad (10)$$

Further, since the slip angle $\theta_s$ is an integrated value of the slip frequency $\omega_s$ it is given by the following equation:

$$\theta_s = \int \frac{R_2}{\Phi_o^2} \cdot T \cdot dt \qquad (11)$$

Since slip engle $\theta_s$ is determined by a sampling computation, the following equation holds:

$$\theta_{s(n)} = \theta_{s(n-1)} + \frac{R_2}{\Phi_o^2} \cdot T \cdot \Delta_t \qquad (12)$$

where $\Delta_t$ represents the sampling time interval, $\theta_{s(n-1)}$ the value of the sampling computation $\theta_s$ at a time earlier by $\Delta_t$ and $\theta_{s(n)}$ the computed value after $\Delta_t$.

Assume now that the sampling time interval $\Delta_t$ is expressed by $\Delta_t = C/R_2$ (where C is a proportionality constant) and that when $\Delta_t$ is inversely proportional to the secondary resistance $R_2$ of the motor, the following equation holds:

$$\theta_{s(n)} = \theta_{s(n-1)} + \frac{C}{\Phi_o^2} \cdot T \qquad (13)$$

Accordingly, it is not necessary to calculate the value of the secondary resistance $R_2$.

This means that the sampling computation is effected only for $C/\Phi_o^2$. However, if the sampling time interval $\Delta_t$ is constant, it is necessary to add the value of the secondary resistance $R_2$ to the computation.

Figure 5A:
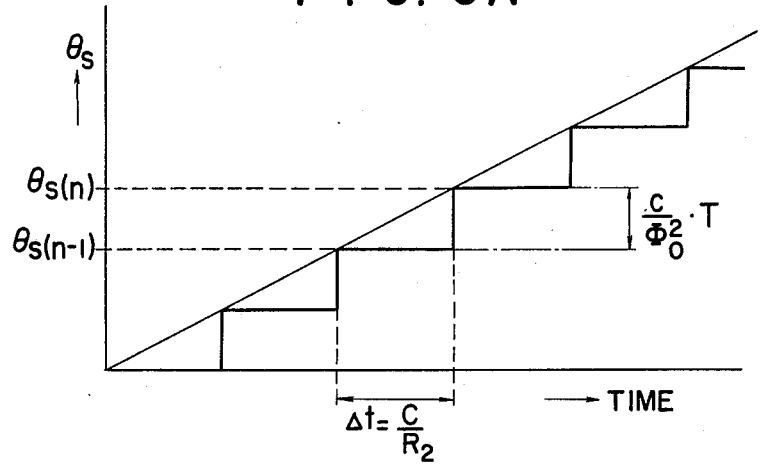
FIGS. 5A and 5B are graphs useful to explain a method of deriving a slip angle by a sampling computation.
Figure 5B:
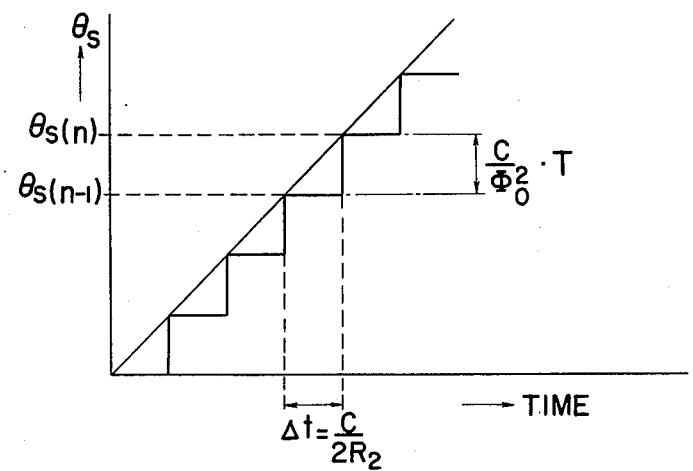

To have a better understanding, the manner of the sampling computation of a case where the value of secondary resistance $R_2$ has been doubled due to temperature increase is shown in FIGS. 5A and 5B. FIG. 5A shows a case where the resistance value of the secondary resistance is $R_2$, whereas FIG. 5B shows a case where the secondary resistance is $2R_2$. In each case notwithstanding the fact that only $C/\Phi_o^2$ is computed at each sampling period since $\Delta_t$ varies with resistance $R_2$ it is possible to obtain the desired slip angle $\theta_s$.

From equation (1), the current $i_{ld}$ that influences the flux of the motor can be shown as follows.

$$i_{ld} = \frac{\Phi_o}{L_2} + \frac{1}{R_2} \cdot \frac{d\Phi_o}{dt} \qquad (14)$$

As above described, the term $\Phi_o/L_2$ of this equation corresponds to the flux current $i_o$ so that by considering the variation in the secondary inductance $L_2$ caused by the magnetic saturation characteristic of the motor 10 the flux current $i_o$ is determined by actually measuring the characteristic of the motor to form a function circuit, and a flux instruction $\Phi_o$ is applied to this circuit, thus determining the flux current $i_o$ from the output thereof.

The term $(1/R_2) \cdot (d\Phi_o/dt)$ is determined by the sampling computation. Denoting the interval of samplings by $\Delta_t$, the value of this time before $\Delta_t$ by $\Phi_{o(n-1)}$ and the value after $\Delta_t$ by $\Phi_{o(n)}$, this term can be expressed as follows:

$$\frac{1}{R_2} \cdot \frac{d\Phi_o}{dt} \approx \frac{1}{R_2} \cdot \frac{\Phi_{o(n)} - \Phi_{o(n-1)}}{\Delta_t} \quad (15)$$

As mentioned above, since the sampling interval $\Delta_t$ is inversely proportional to the secondary resistance $R_2$, that is equal to $C/R_2$, by substituting this value of $\Delta_t$ into equation (15) we obtain $$\frac{1}{R_2} \cdot \frac{d\Phi_o}{dt} \approx \frac{1}{C} [\Phi_{o(n)} - \Phi_{o(n-1)}] \quad (16)$$

As has been described hereinabove, when a torque instruction T and a flux instruction $\Phi_o$ are given, $\Phi_o$ can be determined from current $i_{lq}$ that influences the torque T, current $i_{ld}$ that influences the flux, slip angle $\theta_s$ and the angle of rotation $\theta_r$ of the rotor so that it is possible to determine the phase currents $i_a$, $i_b$ and $i_c$ shown in equations (4), (5) and (6).

Figure 6:
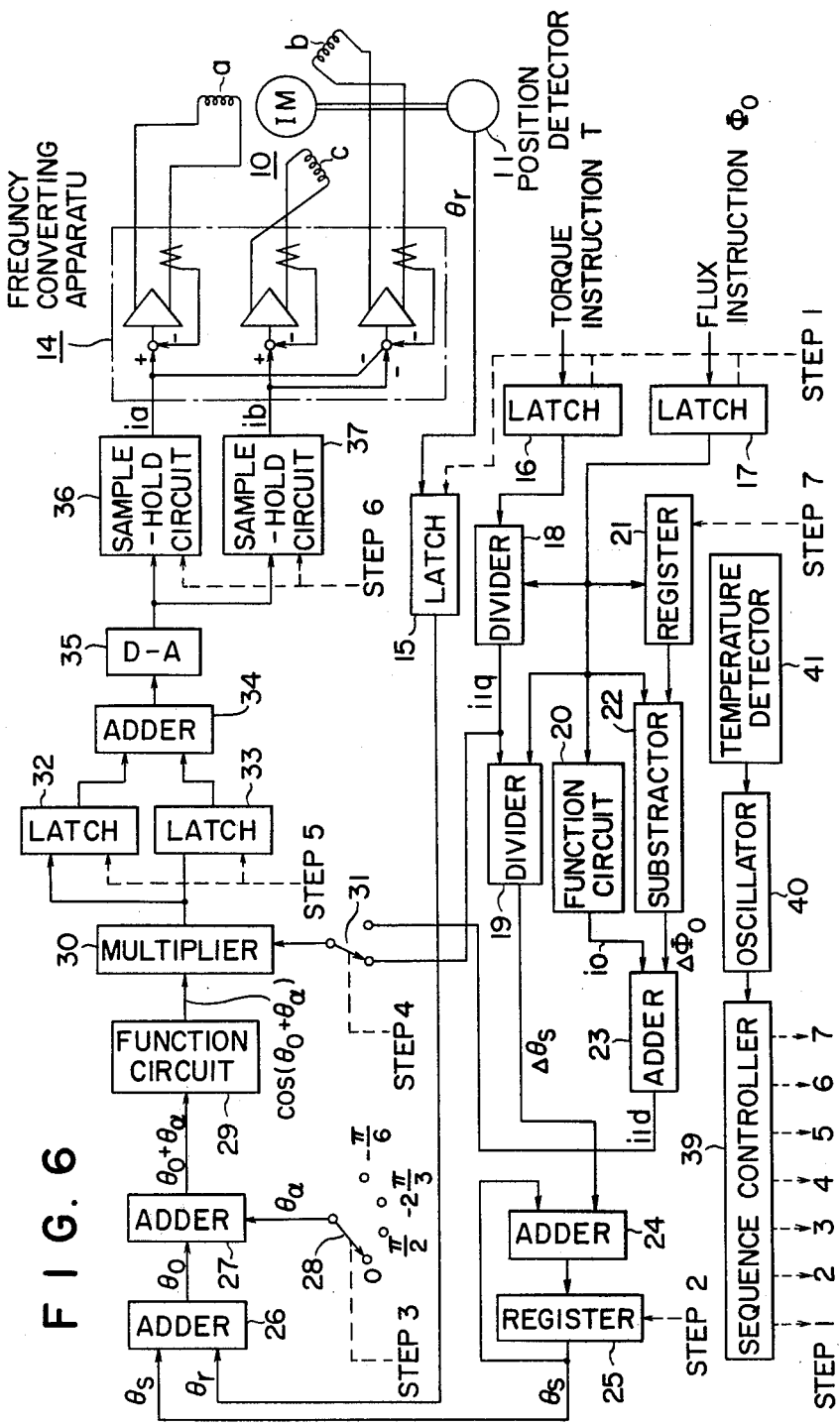
FIG. 6 is a block diagram showing an embodiment of this invention.

FIG. 6 is a block diagram showing the detail of one embodiment of this invention in which motor 10 comprises three phase windings a, b and c. There is provided a position detector 11 which produces a digital signal proportional to the angle of rotation of the rotor, the digital signal gradually increasing from a reference position in proportion to the angle of rotation and then decreasing to zero after the rotation of 360°. The output of the position detector 11 is applied to a latch circuit 15. A digital torque instruction T is applied to a latch circuit 16, and a digital flux instruction is applied to another latch circuit 17. The output of the latch circuits 16 and 17 are applied to a divider 18 which produces a signal $i_{lq}$ which influences only the torque of the motor. This signal $i_{lq}$ is divided by the flux instruction $\Phi_o$ by divider 19 to produce a signal $\Delta\theta_s$ corresponding to slip frequency $\omega_s$. The flux instruction $\Phi_o$ produced by the latch circuit 17 is converted into a flux current $i_o$ which is compensated for the magnetic saturation by a function circuit 20 constituted by a read only memory device. Furthermore, the flux instruction $\Phi_o$ produced by the latch circuit 17 is applied to a register 21 and to one input of a subtractor 22, which in response to the flux instruction and another input from register 21, calculates the change $\Delta\Phi_o$ of the flux during one sampling period. The flux current $i_o$ and the flux change $\Delta\Phi_o$ are applied to an adder 23 to calculate current $i_{ld}$ which influences the magnetic flux of the motor.

An adder 24 is provided to add signal $\Delta\theta_s$ corresponding to the slip angle frequency $\omega_s$ to a previous slip angle $\theta_s$ which has been stored in a register 25 to obtain a new slip angle $\theta_s$ which is stored in register 25. If desired, a suitable delay circuit may be inserted between adder 24 and the register 25 for ensuring a correct operation of the register. This new slip angle $\theta_s$ and signal $\theta_r$ corresponding to the angle of rotation of the rotor and produced by latch circuit 15 are applied to an adder 26 to obtain a signal $\theta_o$ corresponding to the angle of rotation of the axis d.

An adder 27 is provided to add together $\theta_o$ and $\theta_\alpha$ to produce their sum, wherein $\theta_\alpha$ is selected to be either one of 0°, $\pi/2$, $-2\pi/3$ and $\pi/6$ by a transfer switch 28.

In response to the sum $(\theta_o + \theta_\alpha)$, a function circuit 29 produces an output signal cos $(\theta_o + \theta_\alpha)$ which is multiplied by a multiplier 30 with $i_{lq}$ or $i_{ld}$ selected by a transfer switch 31 to produce an output $i_{lq} \cdot \cos(\theta_o + \theta_\alpha)$ which is applied to a latch circuit 32 or an output $i_{ld} \cdot \cos$ $(\theta_o + \theta_\alpha)$ which is applied to a latch circuit 33. The outputs of the latch circuits 32 and 33 are added together by an adder 34 and its digital output is converted into an analogue signal by a digital to analogue converter 35.

The analogue signal produced by the D/A converter 35 is held by latch circuits 36 and 37 at each sampling period and in response to the analogue signal held by these latch circuits, the frequency converting apparatus 14 controls the alternating current supplied to the motor 10.

As is well known in the art, and will be described later, the frequency converting apparatus comprises a rectifier and an inverter which can produce three phase alternating voltage of variable frequency and variable voltage.

Timing signals for operating the transfer switches 28 and 31 and a step signal for effecting the sampling operation are produced by a sequence controller 39. A pulse for determining the sampling interval is applied to the sequence controller 39 from an oscillator 40. As above described, the sampling interval is varied by a temperature detector 41 of the motor to be inversely proportional to the value of the secondary resistance $R_2$.

The circuit shown in FIG. 6 operates as follows. The sampling pulse and a step 1 signal are produced at the same time by the sequence controller 39 and in response to this step 1 signal latch circuits 15, 16 and 17 hold $\theta_r$, torque instruction T and flux instruction $\Phi_o$ respectively.

In response to these signals held by respective latch circuits, the divider 18 calculates a signal $i_{lq}$ which is divided by the flux instruction $\Phi_o$ in divider 19 to form signal $\Delta\theta_s$ corresponding to the slip frequency. By the action of adder 24 this signal $\theta_s$ is added to the previous slip angle signal $\theta_s$ which has been stored in register 25 to obtain a new slip angle signal $\theta_s$. This new slip angle signal is stored in the register 25 under the control of a step 2 signal supplied from the sequence controller 39.

This slip angle signal $\theta_s$ is added to the rotational angle signal $\theta_r$ of the rotor held by the latch circuit 15 by adder 26 to form a signal $\theta_o$.

The flux instruction $\Phi_o$ held by the latch circuit 17 is subtracted with the previous flux instruction stored in register 21 by the action of the subtractor 22 to produce a flux change signal $\Delta\Phi_o$ occurring in a sampling period. If the flux instruction $\Phi_o$ were constant, the flux variation $\Delta\Phi_o$ would be zero.

The function circuit 20 produces a flux current $i_o$ corresponding to the flux instruction $\Phi_o$ held in the latch circuit 17, and this flux current $i_o$ is added to the output of the subtractor 22 by adder 23 to produce signal $i_{ld}$.

In response to a step signal 3 produced by the sequence controller 38, the transfer switch 28 selects $\theta_\alpha = 0$ so that the adder 27 produces an output $\theta_o$. As a consequence, the function circuit 29 produces a digital signal corresponding to cos $\theta_o$.

In response to the next step 4 signal produced by the sequence controller 39, the transfer switch 31 applies signal $i_{ld}$ to multiplier 30 to produce a signal $i_{ld} \times \cos\theta_o$ which is held by latch circuit 33 by the next step 5 signal.

By the sequence described above the term $$(\frac{\Phi_o}{L_2} + \frac{1}{R_2} \cdot \frac{d\Phi_o}{dt})\cos\theta_o$$

is computed and held in the latch circuit 33.

Then the step 3 signal is produced again so that the transfer switch 28 applies a digital signal corresponding to $\pi/2$ to adder 27 so that it produces an output $(\theta_o+\pi/2)$ and the function circuit 29 produces an output $\cos(\theta_o+\pi/2)$.

Then the step 4 signal is produced again so that the transfer switch 31 applies signal $i_{lq}$ to the multiplier 30 to produce an output $i_{lq}\times\cos(\theta_o+\pi/2)$ which is held by the latch circuit 32 by the next step 5 signal.

In response to the next step 6 signal produced by the sequence controller 39 the signals held by the latch circuits 32 and 33 are converted into analogue signals through adder 34 and D/A converter 35 and these analogue signals are held in the sample—hold circuit 36. By the proceeding of the sequence described above, the current $i_a$ supplied to phase a of the motor is determined.

By the progress of the sequence in which step signals are produced in the order of 3, 4, 5, 3, 4, 5 and 6 the sample-hold circuit 37 holds the current $i_b$ supplied to phase b.

Since the alternating circuit is a symmetrical three phase circuit where $i_a+i_b+i_c=0$, the c phase current $i_c$ is expressed by a relationship $i_c=-(i_a+i_b)$.

Accordingly, the phase c current is automatically determined when the phase a current $i_a$ and the phase b current $i_b$ are determined.

After completing the computations of respective phase currents $i_a$, $i_b$ and $i_c$, the previous flux signal stored in the register 21 is replaced by a new flux instruction $\Phi_o$ held in latch circuit 17 thus completing one cycle of computation. More particularly, the sequential cycle completes during one sampling interval $\Delta_t$ between the firstly produced step 1 signal and the step 1 signal produced next time.

Figure 7:
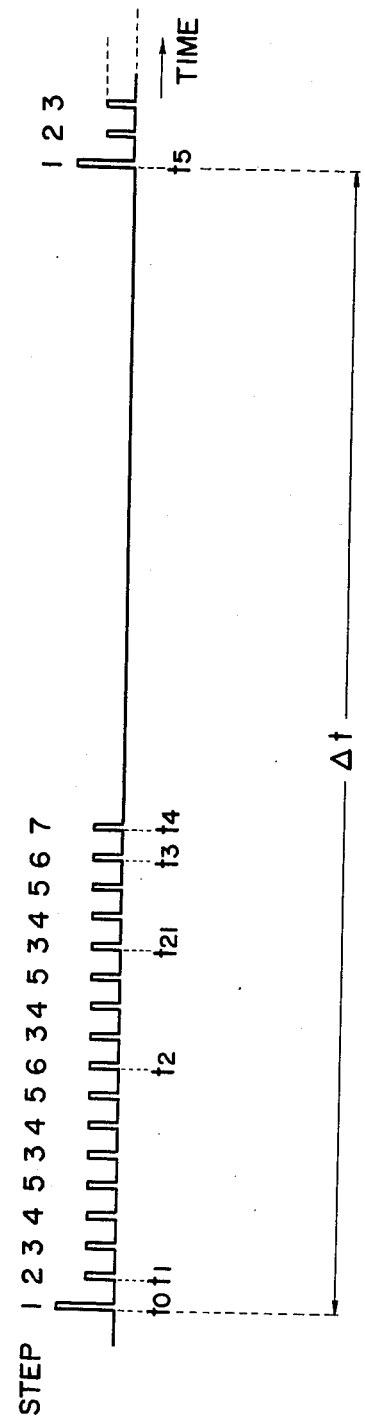
FIG. 7 is a diagram showing the relationship between the sampling time and step signals which advance the sampling computation.

FIG. 7 shows the relationship between one sampling interval $\Delta_t$ and the progress of respective step signals produced by the sequence controller 39. Thus, at time $t_o$ the sequence is started, at time $t_1$ a new $\theta_o$ is determined, at time $t_2$ the phase a current is determined and at time $t_3$ the phase b and phase c currents are determined. At time $t_4$ the content of register 21 is rewritten with the present flux instruction $\Phi_o$. The interval between time $t_3$ and time $t_5$ at which the next sampling pulse arrives at corresponds to a control period.

Figure 8:
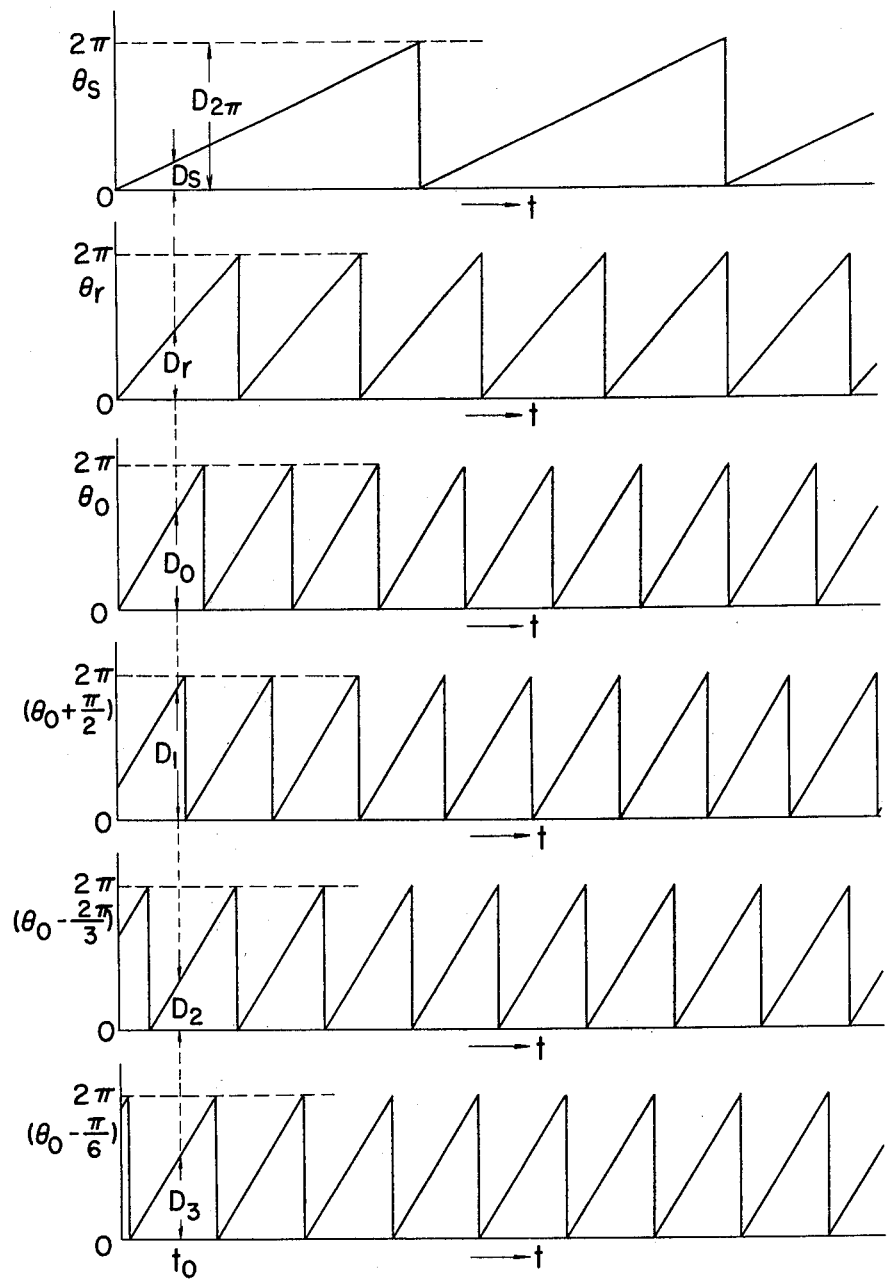
FIG. 8 is a diagram showing the manner of adding the slip angle and the rotation angle of an induction motor by the sampling computation.

FIG. 8 shows the manner of the variations of signals $\theta_s$, $\theta_r$, $\theta_o$ and signals $(\theta_o+\pi/2)$, $(\theta_o-2\pi/3)$ and $(\theta_o-\pi/6)$ under the normal operation in which the angle of rotation of the rotor $\theta_r$ varies over 5 periods while the slip angle $\theta_s$ varies over two periods. During a sampling period at time $t_o$ (since its width is negligibly small, the width of $\Delta_t$ is not shown) the digital quantity $D_o$ is equal to the sum of digital quantities $D_s$ and $D_r$.

Let us denote the digital quantity corresponding to $2\pi$ by $D_{2\pi}$, $D_1$ is expressed by $(D_o+\frac{1}{4}D_{2\pi})$, $D_2$ by $(D_o-\frac{1}{3}D_{2\pi})$, and $D_3$ by $(D_o-1/12D_{2\pi})$. As can be noted from the foregoing description and FIG. 7, the time at which $D_o$ is determined is the time $t_1$ and $D_3$ is determined at time $t_{21}$ shown in FIG. 7. Although different depending upon the type of the computation circuit used, if the interval between $t_o$ and $t_4$ were 200 $\mu$s, it would take about 140 $\mu$s between a time at which $D_o$ is determined and a time at which $D_3$ is determined.

Such small time difference is difficult to show so that in FIG. 8 these points are shown as the same point.

Figure 9:
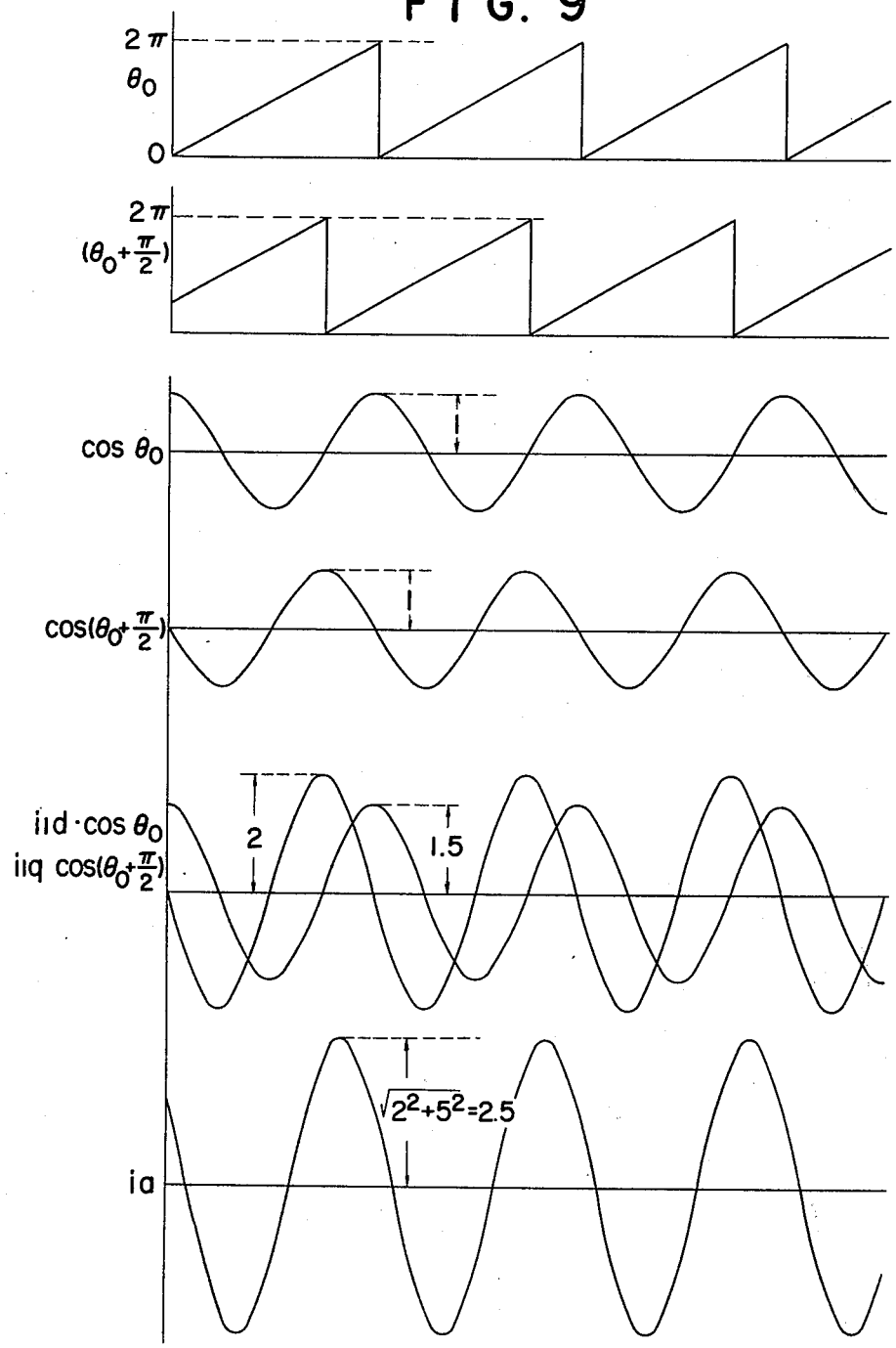
FIG. 9 is a graph showing the current supplied to a given phase of an induction motor.

FIG. 9 shows waveforms showing the relationship between signal $\theta_o$ and the phase a current $i_a$. Thus, after determining $\theta_o$ by adder 26 shown in FIG. 6, in adder 27 $\theta_\alpha=0$ and $\theta_\alpha=\pi/2$ are respectively added to $\theta_o$ to determine $\theta_o$ and $\theta_o+\pi/2$. Then these signals are converted into functions $\cos\theta_o\cos(\theta_o+\pi/2)$ by the function circuit 30 and then multiplied with $i_{ld}$ and $i_{lq}$, respectively by multiplier 30. Where $i_{ld}=1.5$ and $i_{lq}=2$, for example, $i_{ld}\cdot\cos\theta_o$ is a cosine function having a maximum value of 1.5 and $i_{lq}\cdot\cos(\theta_o+\pi/2)$ is a cosine function having a maximum value of 2. By adding together these cosine functions by adder 36, a cosine function having a maximum value of 2.5 is obtained which is converted by the converter 35 into the reference signal $i_a$ of the phase a current $i_a$. Currents of the phases b and c are obtained in the same manner. Thus, at each sampling time, the reference currents for phases a, b and c are determined.

Although the foregoing description relates to a case wherein equations (4), (5) and (6) are computed for executing the control, equations (7), (8) and (9) may be computed, if desired.

Figure 10:
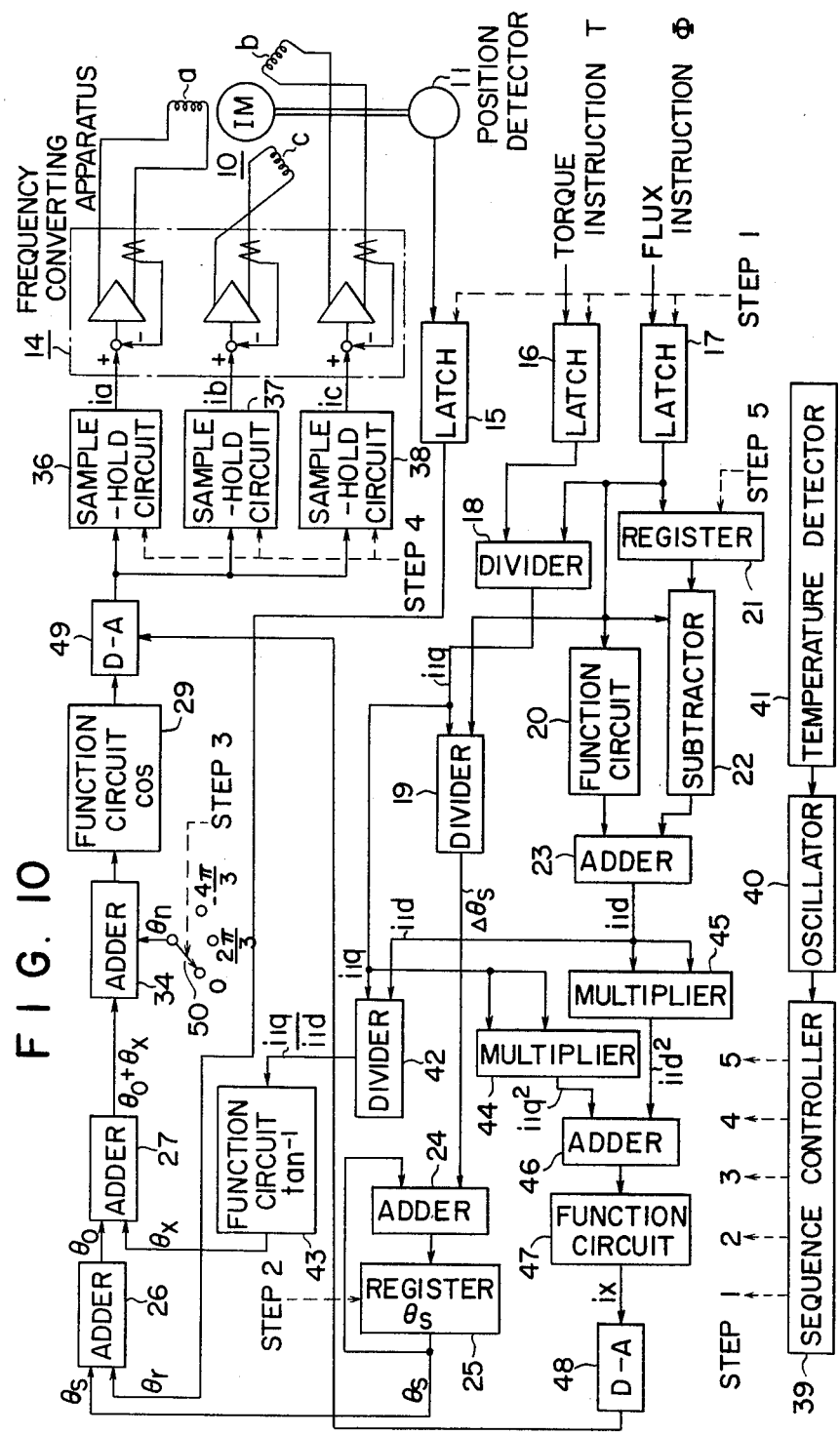
FIGS. 10 and 11 are block diagrams showing modified embodiments of this invention.

A computation circuit for the latter case is shown in FIG. 10 in which circuit elements corresponding to those shown in FIG. 6 are designated by the same reference charactors, and computations for determining signals $\theta_s$, $\theta_r$, $\theta_o$, $i_{ld}$ and $i_{lq}$ are identical to those shown in FIG. 6. In FIG. 10, signals $i_{lq}$ and $i_{ld}$ are applied to divider 42 and its output is applied to function circuit 43 to determine signal $\theta_x$ which is applied to adder 27 together with signal $\theta_o$ to obtain $\theta_o\theta_x$.

Signals $i_{lq}$ and $i_{ld}$ are respectively applied to multipliers 44 and 45 to calculate their squares $i_{lq}^2$ and $i_{ld}^2$. These squares are added together by adder 46 and a root $i_x$ of its output is obtained by function circuit 47. This root signal is applied to D/A converter 49 via a D/A converter 48, the D/A converter 49 having a function of a multiplier.

Under the control of the step 3 signal from the sequence controller 39, a transfer circuit 50 selects 0, $-2\pi/3$, or $4\pi/3$ as signal $\theta_n$ under the control of the step 3 signal from the sequence controller 31 and applies the selected signal to adder 34 to produce and output $(\theta_o+\theta_x+\theta_n)$.

In the circuit shown in FIG. 10, when step 1 signal is applied to latch circuits 15, 16 and 17 from the sequence controller these latch circuits hold new signals $\theta_r$, T and $\Phi$ to determine new signal $\theta_x$.

When step 2 signal is applied to register 25 its content is replaced by a new slip angle signal $\theta_s$ which is added to signal $\theta_r$ by adder 26 to determine a new signal $\theta_o$.

In response to the step 3 signal, the transfer switch 50 selects $\theta_n=0$ whereby the adder produces an output $(\theta_o+\theta_x)$ and the output of D/A converter 49 becomes $i_x=\cos(\theta_o+\theta_x)$. In response to the step 4 signal, the sample-hold circuit 36 holds reference signal $i_a$, the result of the computation described above.

Under the conrol of the next step 3 and step 4 signals, a function $i_b=i_x\cdot\cos(\theta_o+\theta_x-2\pi/3)$ is computed which is held by sample-hold circuit 37. Then by the succeeding step 3 and step 4 signals a function $i_c=i_x\cdot\cos(\theta_o+\theta_x-4\pi/3)$ is computed and held in sample-hold circuit 38. Finally, in response to the step 5 signal, the content of the register 21 is substituted by a present flux instruction $\Phi_o$. Thus, a series of computations of a given sampling period is completed and such computations are repeated in each sampling period.

In this manner, the current supplied to the motor from the frequency converting apparatus is controlled such that it is equal to the reference current determined in each sampling period.

The computations executed by the embodiment shown in FIG. 10 are a little more complicated than those of the embodiment shown in FIG. 6. In the embodiment shown in FIG. 6, the current reference is computed by using two sine waves dephased by $\pi/2$, whereas in the embodiment shown in FIG. 10, by constructing the function circuit 29 to form a desired function, it is possible to control motor 10 with a current wave corresponding to that function.

Although the current wave must be a sine wave in order to work out the invention just according to the theory, where a certain degree of torque pulsation is permissible, more stable control can be provided even when the frequency converting apparatus 14 comprises a relatively inexpensive cyclo-converter which supplies frustum shaped current or a current type inverter which supplies square current. This can be readily understood from the fact that the principle of this invention is also applicable to the fundamental wave which occupies the major portion of the frustum or square shaped current.

Although in the embodiments described above, the torque instruction T and the flux instruction $\Phi_o$ were varied, in some applications, only the torque is varied while the flux is controlled to be constant. In this case, the computation circuit concerning flux can be omitted thus simplifying the computation circuit.

Figure 11:
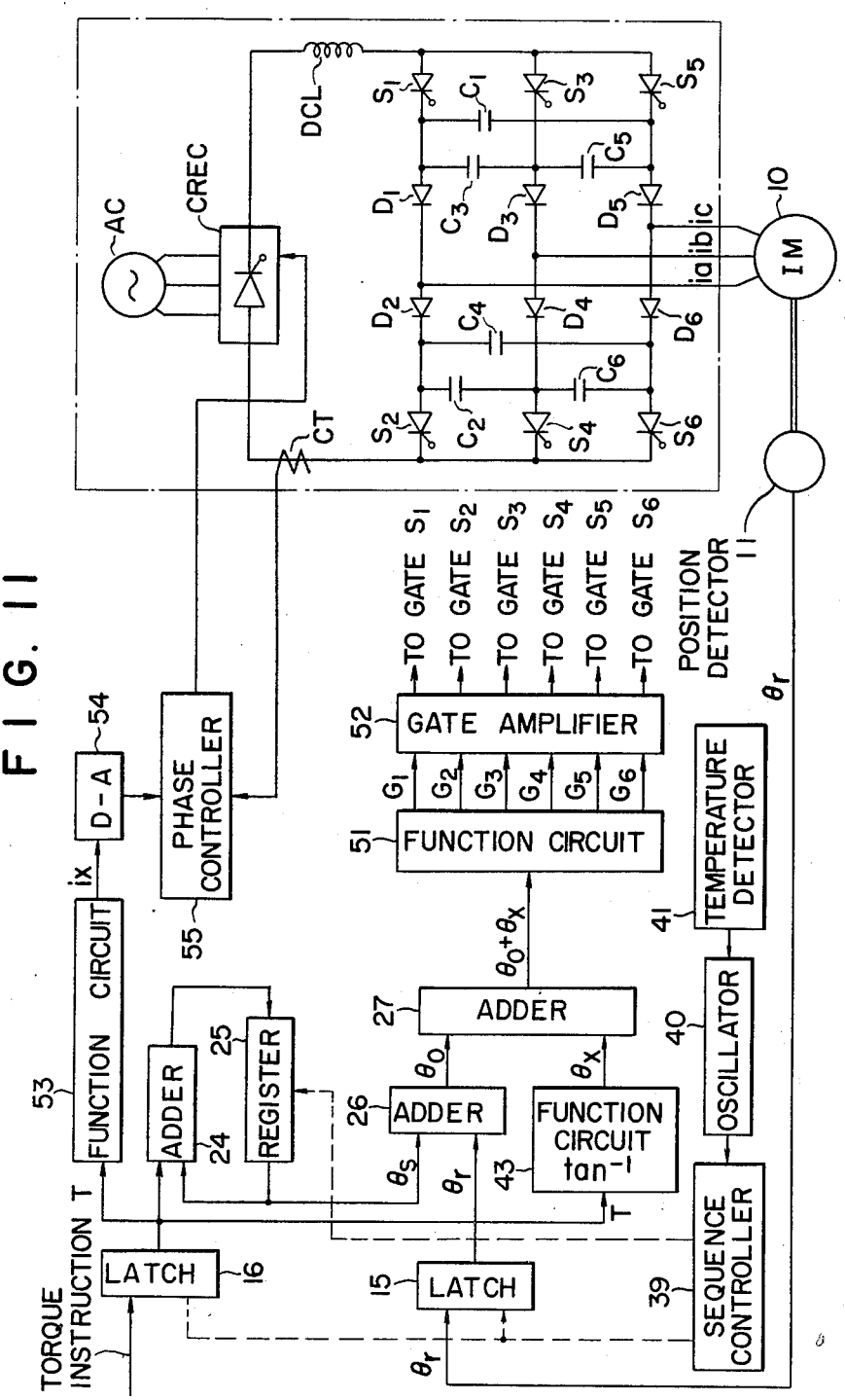

FIG. 11 shows another embodiment of this invention applicable to such application in which the frequency converting apparatus comprises a rectifier and a current type inverter.

More particularly, alternating current supplied from an alternating current source AC is rectified into direct current by a controlled rectifier CREC and the direct current is applied through a DC reactor DCL to a so-called series diode current type inverter comprising thyristors $S_1, S_2, \ldots S_6$, diodes $D_1, D_2, \ldots D_6$ and commutating capacitors $C_1, C_2, \ldots C_6$ to produce alternating current having a desired frequency which is used to drive the motor 10.

Since the construction and operation of the current type inverter are well known in the art, it is believed unnecessary to describe them in detail. This type of inverter is characterized in that the amplitude of its output current is controlled by the controlled rectifier while its output frequency is controlled by varying the frequency of the gate pulse of thyristors $S_1-S_6$.

As in the previous embodiments, the angle of rotation $\theta_r$ of the rotor of the motor detected by position detector 11 and a torque instruction T are held respectively by latch circuits 15 and 16 under the control of the step signals produced by the sequence controller 39 as shown by dotted lines. Since the flux is maintained at a constant value it is possible to directly compute the slip angle $\theta_s$ from the torque instruction T by the adder 24 and the register 25 and the output of register 25 is added to signal $\theta_r$ by adder 26 to obtain signal $\theta_o$. The torque instruction T is applied directly to a function circuit 43 to be subjected to a $\tan^{-1}$ function conversion thus forming a signal $\theta_x$. Signals $\theta_o$ and $\theta_x$ are added together by adder 27 and the sum $(\theta_o + \theta_x)$ is applied to a function circuit 51 which is set with switching functions corresponding to the gate signals of respective thyristors of the current type inverter, each having a conduction period of $\frac{2}{3}\pi$.

Figure 12:
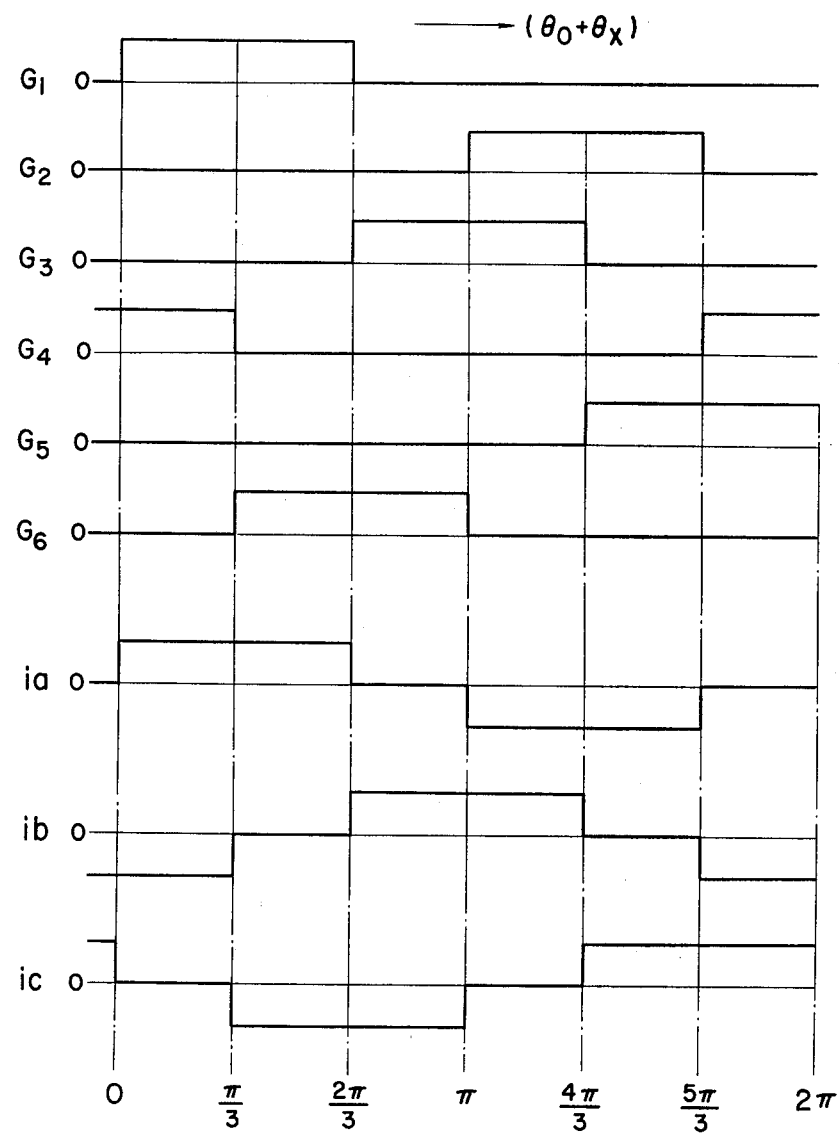
FIG. 12 shows waveforms useful to explain the operation of the embodiment shown in FIG. 11.

Thus, as shown in FIG. 12, the function circuit 51 generates an output $G_1$ for a value of $0-2\pi/3$ of the input signal $(\theta_o+\theta_x)$, an output $G_2$ for a value of $\pi-5\pi/3$, an output $G_3$ for a value of $2\pi/3-4\pi/3$, an output $G_4$ for a value of $0-\pi/3$, an output $G_5$ for a value of $4\pi/3-2\pi$ and an output $G_6$ for a value of $\pi/3-\pi$. These output signals $G_1-G_6$ are converted into pulses suitable for use as the gate signals of the thyristors $S_1-S_6$ of the inverter by a gate signal amplifier 52.

Where output signals $G_1-G_6$ correspond respectively to gate signals $S_1-S_6$, the respective phase currents $i_a$, $i_b$ and $i_c$ of the motor 10 are shown in FIG. 12.

The torque instruction T is converted into a signal $i_x$ by a primary current amplitude function of the torque instruction (under a condition of constant flux) set in a function circuit, and signal $i_x$ is converted into a corresponding analogue signal $i_x$ by a D/A converter 54. This analogue singla $i_x$ and the output of a current detector CT which detects direct current supplied to the inverter from the controlled rectifier CREC are used to control a phase controller 55 so as to control the output current of the rectifier to be proportional to the output current $i_x$. In other words, the amplitude of respective phase currents $i_a$, $i_b$ and $i_c$ are controlled to be proportional to the output current $i_x$. Although, the waveform of the current supplied to the motor is square, the fundamental wave comprising the major portion thereof is controlled according to the output current $i_x$ for the reason described above.

Although in the foregoing embodiments, the sampling computation necessary for the control was performed by using latch circuits, function circuits and registers, it will be clear that such computation can be made by a microcomputer program. Thus various addition, subtraction, multiplication and division operations are executed by a central processing unit of the computer, and the sequential control of these arithmetical operations and various functions of the sequence controller can also be effected by the central processing unit. The latch circuits, function circuits, registers, etc., may be substituted by such memory devices as read only memory devices or random access memory devices which are controlled by the central processing unit.

As in the embodiment shown in FIG. 11, certain computations may be omitted depending upon the type of frequency converting apparatus, or whether the output torque characteristic should be linear or nonlinear with respect to the flux control or the torque instruction.

Furthermore, for the purpose of differentiating the flux instruction, the difference between a previous flux instruction and a new flux instruction was used, where signals are processed in the computation circuit in terms of digital quantities and where the number of bits of the signals is small, a more efficient control can be provided by averaging the minute times whose difference is to be obtained by elongating the minute times for calculating the slip angle, or by minimizing the error of the sampling computation by using a digital filter.

As above described, according to this invention since in response to a torque instruction, the actual motor torque is controlled by controlling not only the amplitude but also the phase of the primary current such that the actual flux of the motor becomes directly proportional to a flux instruction it is possible to control current that influences only the torque and current that influences flux always at perpendicular relationship. For this reason, there is no fear of transiently departing from the perpendicular condition which results in such unstable phenomena as oscillation which has been inevitable when only the amplitude of the primary current is controlled as in the prior art.

Moreover, it is also possible to eliminate the defects caused by the variation of the constants of the motor which affect the control response that is magnetic saturation or the variation of the secondary resistance caused by temperature variation. Especially, the adverse effect caused by the variation of the secondary resistance can be avoided by varying the sampling period without changing the computation circuit by the unique utilization of the performance of the sampling control. Thus for different motors, it is only necessary to adjust the sampling period and the gain of the output current with respect to the current reference of the frequency converting apparatus. Especially where digital computations are performed with a microcomputer, computations having desired accuracies can be made without adjusting the computation circuit thus preventing deviation of the control characteristic caused by the adjustment.

Where the field control of the motor is made, it is possible to perform all controls with a single frequency converting apparatus whithout using any special measure.

Where a speed feedback control system, a position feedback control system or an automatic field weakening control system is incorporated into the system of this invention, it is possible to provide a speed control and an automatic field weakening control for induction motors just the same as those of direct current motors.

What is claimed is:

1. A method of controlling an induction motor comprising the steps of
sequentially adding digital quantities corresponding to a slip frequency of said induction motor at a predetermined time interval,
adding the sum of said sequentially added digital quantities to a digital quantity proportional to an angle of rotation of said motor to obtain a sum value,
computing a primary current vector of said induction motor from said sum value and a current component which influences only the torque of said motor, and
controlling the primary current of said induction motor based upon said primary current vector.

2. The method according to claim 1 wherein said predetermined time interval is inversely proportional to a secondary resistance of said induction motor.

3. The method according to claim 1 wherein said primary current vector is computed from said sum value, said current component which influences only the torque of said motor and the magnetic flux thereof.

4. The method according to claim 1 wherein said slip frequency is computed from a torque instruction and a flux instruction of said induction motor and said primary current vector is computed from said sum value, a current component computed from said torque instruction and said flux instruction and influences only the torque of said motor, and a current component which influences the flux of said motor.

5. The method according to claim 2 wherein said primary current vector is computed from said sum value, a current component which influences only the torque of said motor and a current component which influences the flux of said motor.

6. A method of controlling an induction motor comprising the steps of
sequentially adding, at a first time interval inversely proportional to the secondary resistance of said motor, digital quantities corresponding to a slip frequency of said motor, computed from a torque instruction and a flux instruction thereof to obtain a first sum value,
adding said first sum value to a digital quantity proportional to an angle of rotation of said motor by sampling said digital quantity at said time interval to obtain a second sum value,
sample computing a primary current vector of said induction motor, at a second time interval proportional to said first time interval, from said second sum value, a current component computed from said second sum value, said torque instruction and said flux instruction and influences only the torque of said motor and a current component which influences the flux of said motor, and
controlling the primary current of said induction motor based on said primary current vector.

7. A system of controlling an induction motor comprising
frequency converting apparatus including a rectifier and an inverter for supplying variable frequency alternating current to said motor;
means responsive to a predetermined torque instruction T and a predetermined flux instruction $\Phi_o$ to produce a slip frequency signal $\Delta\theta_s$;
means responsive to said slip frequency signal to produce a slip angle signal $\theta_s$;
means responsive to the rotation of said motor for producing a rotational angle signal $\theta_r$;
a first adder for adding together said slip angle signal $\theta_s$ and said rotational angle signal $\theta_r$;
selection a switch means for selecting predetermined one $\theta_\alpha$ of a plurality of rotational angles of said motor;
a second adder for adding together the outputs of said first adder and said first transfer switch means;
means responsive to said torque instruction and said flux instruction for producing a current signal $i_{1q}$ which influences the torque of said motor;
means responsive to said flux instruction and a flux change of said motor during a sampling period for producing a current signal $i_{1d}$ which influences the magnetic flux of said motor;
a function circuit for producing a trigonometric function of the output of said second adder;
a multiplier for multiplying the output of said function circuit with either one of said current signals $i_{1q}$ and $i_{1d}$;
means responsive to the output of said multiplier for controlling said frequency converting apparatus; and
a sequence controller for sequentially operating various means and elements described above.

8. The system according to claim 7 wherein said sequence controller comprises an electric oscillator and a temperature detector responsive to the temperature of said motor for controlling the operation of said oscillator.

9. The system according to claim 7 wherein said means for producing said current signal $i_{1d}$ comprises a function circuit responsive to said flux instruction $\Phi_o$ for producing a flux current signal $i_o$, means responsive to said flux instruction $\Phi_o$ for producing a flux change signal $\Delta\Phi_o$ during a sampling period and an adder for adding together said flux current signal $i_o$ and said flux change signal $\Delta\Phi_o$.

10. The system according to claim 7 wherein said means for producing said slip angle signal $\theta_s$ comprises a register and an adder connected to receive said slip frequency signal $\Delta\theta_s$ and a previous slip angle signal $\theta_s$ which has been stored in said register and applies the output to said register.

* * * * *